Figure 1:
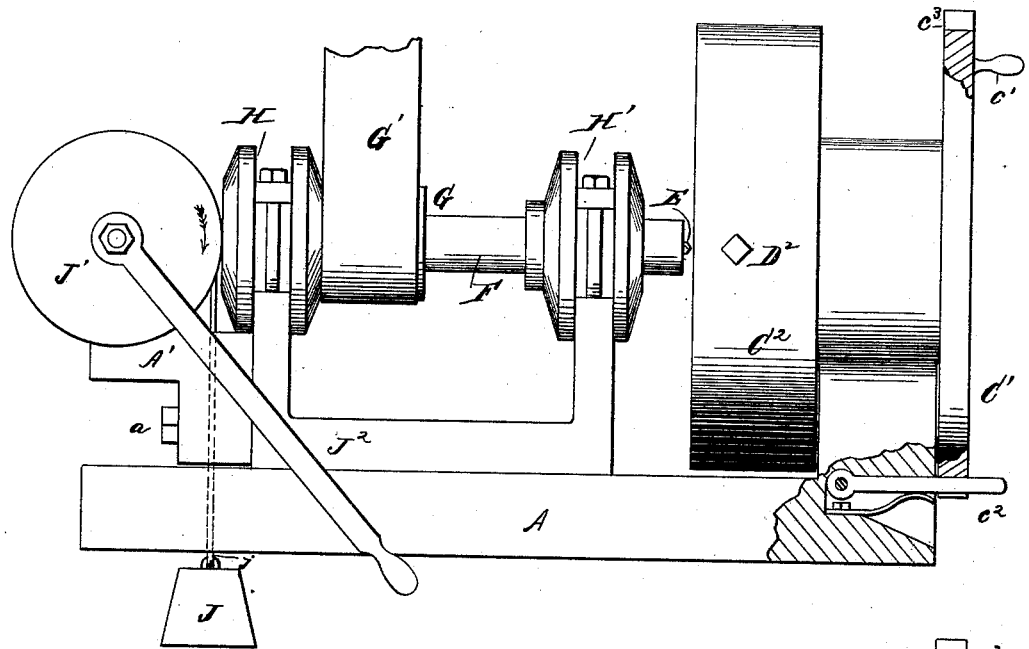

(No Model.)  2 Sheets—Sheet 1.

H. H. TAYLOR.
NUT DRILLING MACHINE.

No. 391,824. Patented Oct. 30, 1888.

Attest:
John E. Wiles.
W. J. Smith.

Inventor:
Harrison H. Taylor.
By Newell & Wright.
Attorney.

(No Model.) 2 Sheets—Sheet 2.
H. H. TAYLOR.
NUT DRILLING MACHINE.
No. 391,824. Patented Oct. 30, 1888.
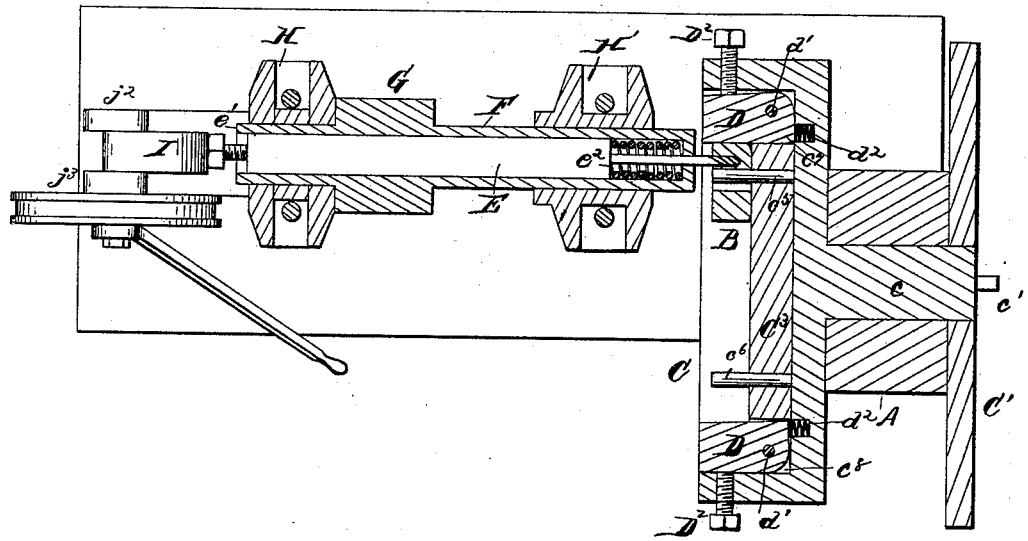
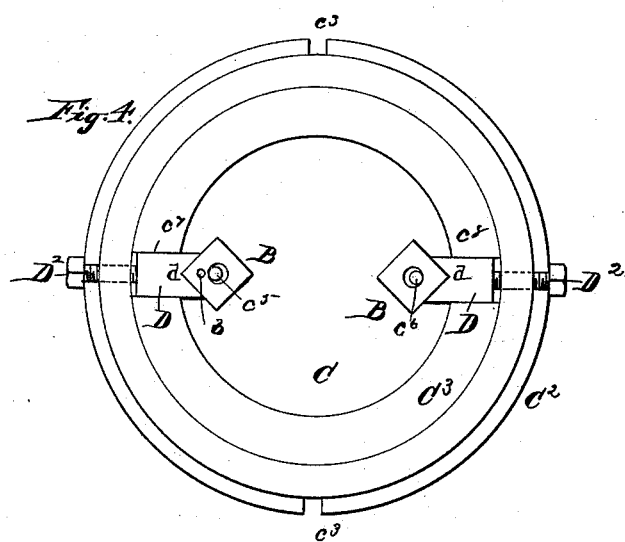
Attest.
John E. Wiles.
W. J. Smith.
Inventor.
Harrison H. Taylor.
By Newell S. Wright.
Attorney.
N. PETERS, Photo-Lithographer, Washington, D. C.

UNITED STATES PATENT OFFICE.

HARRISON H. TAYLOR, OF DETROIT, MICHIGAN.

NUT-DRILLING MACHINE.

SPECIFICATION forming part of Letters Patent No. 391,824, dated October 30, 1888.

Application filed May 2, 1888. Serial No. 272,559. (No model.)

*To all whom it may concern:*

Be it known that I, HARRISON H. TAYLOR, a citizen of the United States, residing at Detroit, county of Wayne, State of Michigan, have invented a certain new and useful Improvement in Nut-Drilling Machines; and I declare the following to be a full, clear, and exact description of the same, such as will enable others skilled in the art to which it appertains to make and use the same, reference being had to the accompanying drawings, which form a part of this specification.

The object and purpose of this invention is to provide a novel nut-drilling machine, the same having special reference to the drilling of a certain lock-nut herewith illustrated, although I would have it understood that I contemplate the employment of the machine for drilling any article for which it is found adapted.

My invention consists of the devices and appliances, together with their combinations and arrangements, as more fully illustrated in the drawings submitted herewith, and more particularly pointed out in the following specification and claims.

Figure 2:
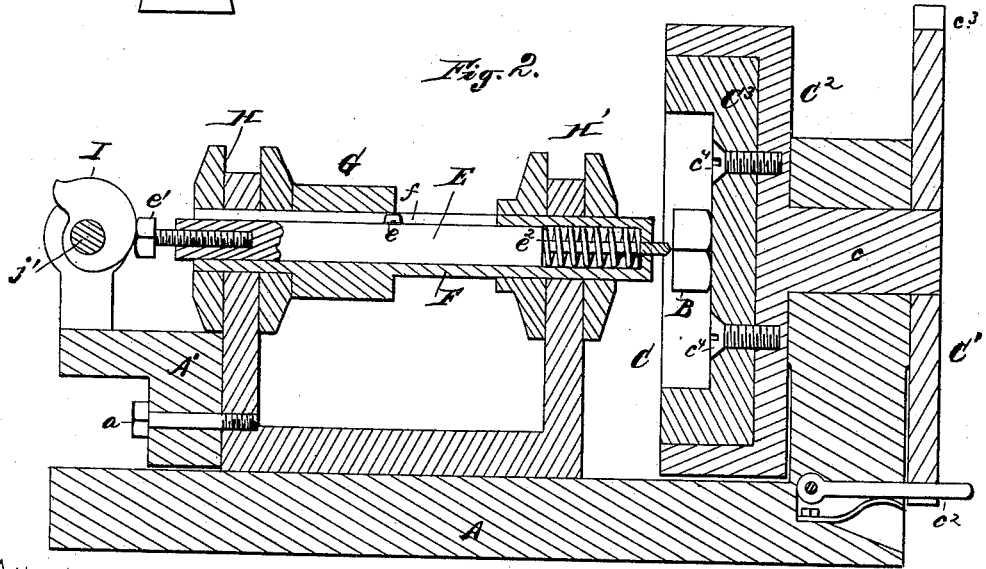

In the drawings, Figure 1 is a side elevation; Fig. 2, a vertical longitudinal section. Fig. 3 is a horizontal longitudinal section; Fig. 4, a front view of the disk or plate.

I carry out my invention in the following manner:

A represents any suitable bed or support.

B is an ordinary nut in which it is desired to drill an orifice, $b$, extending in the direction of the bore of the nut, and which must be drilled with accuracy precisely at a given distance from the center of the bore, so that the various nuts when drilled will be exact duplicates.

It will be understood that accuracy in the working of the drilling-machine is essential to the satisfactory operation of the completed lock-nut, and this is the aim of this invention.

C represents a plate or disk upon which the nut is carried and held. Said plate is journaled in the support A, as shown at $c$, and provided with a rocking disk or arm, C', on the outer extremity of the journal. The rocking disk or arm is provided with an operating-handle, $c'$, and any suitable latch or locking device, as shown at $c^2$. To this end the said disk C' may be notched upon its periphery to engage a spring-arm, $c^2$, engaged upon the bed or support, the engagement of the spring-arm with the notched disk being effected, preferably, at every half-revolution of the plate C. This latter plate I prefer to construct in two parts, consisting of an outer rimmed disk, C², and an inner rimmed disk, C³, secured upon the disk C², as by bolts $c^4$. The inner disk is provided, preferably, with two posts, $c^5$ $c^6$, upon which a nut may be mounted. Where two posts are provided, the operator may readily engage a nut upon the one while the drill is at work upon the other. It is necessary thus simply to give a half-revolution to the disk C to bring the posts $c^5$ $c^6$ alternately before the operator and alternately to the drill. The number of posts upon the disk is not, however, a fundamental feature.

To hold the nut accurately in place upon the post, I employ a jaw, D, adjustably engaged adjacent to each post, the jaw being constructed with an angular recess, as at $d$, to engage the nut upon the outside and preferably upon one corner thereof, as shown in Fig. 4. Any suitable jaw to properly hold the nut firmly and accurately may, however, be used. The jaw may be held in place by providing the inner disk with a corresponding recess, as at $c^7$ $c^8$, to receive the jaw, Fig. 4. In order to adapt the jaw for engaging nuts of different sizes, I prefer to pivot it upon its inner end, as shown at $d'$. An adjusting-screw, D², is engaged in the rim of the disk C², and a spring, $d^2$, may be provided to throw the jaw open. The work is thus centered upon the posts in a firm manner and with utmost accuracy. Being thus centered from the interior and firmly held, the drill must of necessity operate with constant precision. Posts of a single size may be employed for different sizes of nuts.

E is the drill, engaged in a sleeve, F, and having a longitudinal movement therein, the engagement of the drill in the spindle, however, being such that both will rotate together.

G is the driving-pulley engaged upon the spindle.

G' is the driving-belt.

To permit the longitudinal movement of the drill in the sleeve, the latter is constructed with an elongated slot, $f$, and the drill with a lug, $e$, to engage therein. This construction acts as a guide, and also insures the rotation of the drill and sleeve simultaneously. The sleeve is journaled in any suitable bearings, H H', in the supporting bed or frame. The sleeve I prefer to construct of a piece of hardened steel, and the drill working thus through the sleeve is protected from wear, while it is also held perfectly firm and is held to its work upon the nut in a very accurate manner.

The drill is fed to the work or forced thereupon by means of a cam, I, of suitable form, which presses upon the head of an adjusting-screw, $e'$, in the end of the drill adjacent thereto. The cam may be operated by any desired means. I prefer to apply its pressure upon the drill by means of a weight, J, suspended by a strap, $j$, over a pulley, J', upon the shaft $j'$, on which the cam is engaged, the shaft having suitable bearings, $j^2 j^3$, upon the support A' on frame A. This method of operation renders the drill very sensitive. The weight is readily raised by means of a hand-lever, $J^2$, thereby at the same time retracting the cam, when the drill may be automatically forced back by a spring, $e^2$.

When the drill is shortened by wear or by sharpening, the screw $e'$ is run out, so as to make the drill of the given length required.

For convenience of removing the drill, I prefer to hinge the support A' for the bearings of the cam and related parts upon the bed A, as shown at $a$, so that the cam may be readily turned over out of the way.

I do not limit myself to the precise manner of constructing the supporting-plate C herewith shown and described, as any suitable device for retaining the centering-post would come within the scope of my invention.

The post fits loosely into the bore of the nut, the jaw forcing the nut against the post and holding it firmly thereupon. In this manner the drill will center at exactly the required position on the nut.

What I claim is—

1. In a drilling-machine, the combination, with a rotatable spindle, of a drill simultaneously rotatable therewith, said drill having a reciprocal engagement in the spindle, an adjusting-screw secured to said spindle, and a cam adapted to engage said adjusting-screw to drive the spindle, substantially as set forth.

2. In a drilling-machine, the combination, with a rotatable sleeve, of a reciprocatory drill-spindle and drill simultaneously rotatable with the sleeve, a screw working in the end of said drill-spindle for adjusting its length, and a cam working against the end of said screw, substantially as set forth.

3. In a drilling-machine, the combination, with a rotatable sleeve, of a reciprocatory drill simultaneously rotatable with the sleeve, means for forcing the drill upon the work, and a retracting-spring to return the drill to its normal position, substantially as described.

4. In a drilling-machine, the combination, with a rotatable sleeve, of a reciprocatory drill simultaneously rotatable with the sleeve, a cam to force the drill upon the work, and a weight arranged to operate the cam, substantially as described.

5. In a drilling-machine, the combination of a rotatable sleeve with a reciprocatory drill simultaneously rotatable with said sleeve and a retracting-spring inclosed within said casing for returning the drill to its normal position, substantially as set forth.

6. In a drilling-machine, the combination, with a suitable support, of a plate provided with one or more centering-posts to hold a nut and center it from the interior, and means to prevent the turning of the nut upon said post, substantially as described.

7. In a drilling-machine, a suitable support having in combination therewith a plate provided with one or more retaining-posts to hold a nut and center it thereupon inside the nut, and a jaw to engage the exterior of the nut, substantially as described.

8. In a drilling-machine, a suitable support having in combination therewith a plate journaled therein and provided with one or more retaining-posts to hold a nut and center it from the inside, and means to engage the nut on the exterior, substantially as described.

9. The combination with the support, of a plate journaled thereupon and provided with a retaining-post and a jaw, the one to engage a nut from the inside and other upon the exterior of the nut, said plate made rotatable and provided with a locking device, substantially as described.

10. The combination, with the support, of a plate provided with a retaining-post and a jaw to engage a nut from the exterior, said plate constructed of an exterior and an interior removable disk, substantially as described.

In testimony whereof I sign this specification in the presence of two witnesses.

HARRISON H. TAYLOR.

Witnesses:
N. S. WRIGHT,
JOHN E. WILES.